United States Patent
Yoshima

(10) Patent No.: US 7,241,968 B2
(45) Date of Patent: Jul. 10, 2007

(54) CONSUMABLE ELECTRODE ARC WELDING METHOD

(75) Inventor: Kazumasa Yoshima, Higashi Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/566,848

(22) PCT Filed: Apr. 20, 2005

(86) PCT No.: PCT/JP2005/007543

§ 371 (c)(1),
(2), (4) Date: Feb. 1, 2006

(87) PCT Pub. No.: WO2005/102580

PCT Pub. Date: Nov. 3, 2005

(65) Prior Publication Data

US 2006/0201921 A1    Sep. 14, 2006

(30) Foreign Application Priority Data

Apr. 20, 2004   (JP) ............................. 2004-123953

(51) Int. Cl.
*B23K 9/12*        (2006.01)

(52) U.S. Cl. ................................ 219/125.1; 219/137.71
(58) Field of Classification Search ............ 219/137.2, 219/137.71, 125.1
See application file for complete search history.

(56) References Cited

FOREIGN PATENT DOCUMENTS

| JP | 5-245638 A | * | 9/1993 |
| JP | 6-54462 | * | 7/1994 |
| JP | 2002-361413 | | 12/2002 |
| JP | 2002-361414 | | 12/2002 |
| JP | 2003-62669 A | * | 3/2003 |

* cited by examiner

*Primary Examiner*—Clifford C. Shaw
(74) *Attorney, Agent, or Firm*—Pearne & Gordon LLP

(57) ABSTRACT

The invention includes means for, when welding a crater in a welding termination portion, moving a torch in a direction allowing the whole of the torch to part apart from a molten pool and, therefore, the invention can prevent all welding wires from coming into contact with the molten pool. Also, the invention can check not only the crater-welded welding wire but also all of the remaining welding wires for deposition and, if there is detected a deposited wire, can energize the deposition detected wire again to thereby be able to remove the deposition of the wire.

8 Claims, 4 Drawing Sheets

CONSUMABLE ELECTRODE ARC WELDING METHOD

TECHNICAL FIELD

The present invention relates to a consumable multiple electrode arc welding method for welding by feeding two or more wires in a torch and, in particular, to a welding control method for controlling the welding of a welding termination part.

BACKGROUND ART

As a consumable electrode arc welding method for welding by feeding a wire in a torch, conventionally, there has been used a consumable single electrode arc welding method for welding by feeding a single wire in a torch. Also, recently, there has been also used a consumable multiple electrode arc welding method for welding by feeding two or more wires in a torch. Especially, in recent years, the consumable multiple electrode arc welding method has been applied to an automatic can manufacturing process, that is, because of its high deposition metal welding, it has been used as one of production efficiency enhancing means. Here, the term "high deposition metal welding" means the welding that forms molten deposition metal with high efficiency.

Also, in these consumable electrode arc welding methods, it is generally known that a weld bead recess called a crater is formed in the welding termination part, which makes it necessary to weld the welding termination part further for filling the crater in. To fill the crater in, in the consumable single electrode arc welding method for welding by feeding a single wire in a torch, the welding termination portion is welded by stopping the torch for a given time at the welding termination position while discharging an arc of a given condition to thereby fill the crater in. On the other hand, in the consumable multiple electrode arc welding method for welding by feeding two or more wires, due to the high molten metal welding thereof, a crater tends to be larger than in the consumable single electrode arc welding method. Because of this, simply by stopping the torch for a given time at the welding termination position for welding the crater, the crater cannot be filled in sufficiently.

Thus, conventionally, for example, in a tandem welding method which is one of consumable multiple electrode arc welding methods, there has been proposed a welding operation to be executed in the welding termination portion for filling such crater in. For instance, according to the JP-A-2002-361413 publication, there is disclosed a method in which, when a welding operation reaches a welding termination position, after the arc generation of a consumable electrode preceding in the welding proceeding direction is terminated, while keeping the arc generation of a consumable electrode following in the welding proceeding direction, the welding operation in the welding proceeding direction is continued for welding the welding termination portion. Also, in the JP-A-2002-361414 publication, when a welding operation reaches a welding termination position, after the arc generation of a consumable electrode following in a welding proceeding direction is terminated, while keeping the arc generation of a consumable electrode preceding in the welding proceeding direction, the torch is moved back in the opposite direction to the welding preceding direction for welding.

DISCLOSURE OF THE INVENTION

Problems to be Solved by the Inventiion

However, in the above-mentioned conventional consumable multiple electrode arc welding methods, there is a possibility that, while a welding operation to fill the crater in is in execution using only one of the multiple consumable electrodes, the wires of the remaining consumable electrodes not used for welding may come into contact with a welding pool and may be deposited in the welding termination time. When such wire deposited state occurs, for example, in an automatic welding machine such as a welding robot, the succeeding operations cannot be carried out continuously.

In view of the above, it is an object of the invention to provide a welding method which can prevent the occurrence of the wire deposited states of all welding wires in the welding termination time in the consumable multiple electrode arc welding method.

Means for Solving the Problems

To solve the above-mentioned problems found in the conventional consumable multiple electrode arc welding method, according to the invention, there is provided a consumable electrode arc welding method in which two or more wires are fed and energized in a torch and, while moving the torch in the welding proceeding direction, weld beads are formed for welding, comprising: a first step of stopping the feeding and energization of all of the above wires except for a specified wire at a welding termination position; and, a second step of moving the torch by a given amount from the welding termination position to a position in a direction which is opposite to the welding proceeding direction and parts away form the weld beads.

And, the consumable electrode arc welding method of the invention further includes a third step of moving the torch substantially parallel with the weld beads in the welding proceeding direction from the position of the torch to which the torch has been moved in the second step.

Also, according to the invention, a wire to be specified in one torch is a wire which, when moving the torch in the welding proceeding direction, is to be moved most precedingly in the torch.

And, according to the invention, a welding operation using a specified wire in one torch is performed under a welding termination time welding condition different from the welding condition that has been used so far.

Also, according to the invention, in the second and third steps, a crater processing operation for filling in a crater occurring in the welding termination portion is executed under the welding termination time welding condition.

Further, the invention further includes a fourth step of stopping the feeding and energization of the wires at the position of the torch to which the torch is moved in the third step, a fifth step of checking all wires for deposition on the weld beads, and a sixth step of, when the deposited wires are detected in the fifth step, resuming energization of at least the deposition detected wires.

Effects of the Invention

As described above, according to a welding control method for controlling the welding of the consumable multiple electrode arc welding termination portion, all wires can be prevented from coming into contact with a molten pool, thereby being able to prevent all wires from being deposited on the molten pool. Also, even when any one of the wires is deposited on the molten pool, the deposition can

DESCRIPTION OF REFERENCE CHARACTERS

Figure 1:
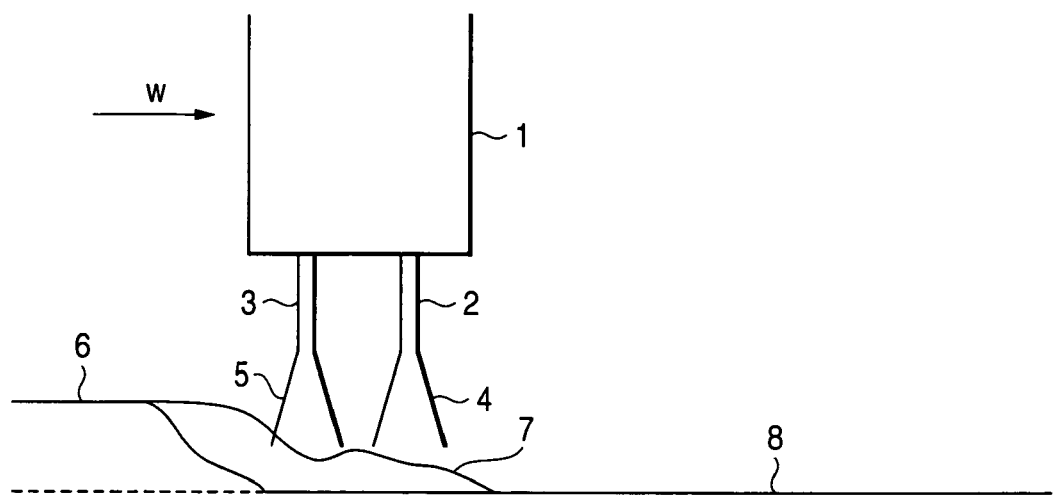
FIG. 1 is a view of an embodiment 1 of a consumable electrode arc welding method, showing a stage before reaching a welding termination position.

1: Torch
w: Welding proceeding direction
2, 3: Wire
6: Weld bead
L, Tz: Given moving amount
201: Step of stopping feeding and energization of all wires except for a specified wire
204: Step of moving a torch by a given amount to a position existing in a direction which is obliquely opposite to the welding proceeding direction and parts apart from the weld bead.
207: Step of moving a torch substantially parallel with the weld bead in the welding proceeding direction
202, 205: Step of setting a welding termination time welding condition different from a normal welding condition used until then.
301: Step of stopping the feeding and energization of all wires except for a specified wire.
304: Step of moving a torch by a given amount to a position existing in a direction which is obliquely opposite to the welding proceeding direction and parts apart from the weld bead to a position.
307: Step of moving a torch substantially parallel with the weld bead in the welding proceeding direction.
302, 305: Step of setting a welding termination time welding condition different from a normal welding condition used until then.
310: Step of stopping the feeding and energization of wires.
312: Step of checking all wires for deposition on the weld bead.
313: Step of resuming energization of the wire.

BEST MODE FOR CARRYING OUT THE INVENTION

Now, description will be given below of the best mode for carrying out the invention with reference to FIGS. 1 to 6. Specifically, as the most practically used example of consumable multiple electrode arc welding terminating methods which execute a welding operation by feeding two or more wires in a torch, there is taken a method for terminating tandem welding which uses two wires by arranging them on a welding line.

EMBODIMENT 1

In FIGS. 1 to 4, reference character w designates the welding proceeding direction of the present welding, 1 a torch, 2 a consumable electrode wire preceding in the welding proceeding direction w of the present welding (which is hereinafter referred to as a preceding wire), 3 a consumable electrode wire following in the welding preceding direction w of the present welding (which is hereinafter referred to as a following wire), 4 an arc generated from the preceding wire, 5 an arc generated from the following wire, 6 a weld bead formed, 7 a molten pool, and 8 a welding base metal, respectively. Also, during the welding, the respective wires 2 and 3 are successively fed by a feed device (not shown). Further, welding machines (not shown) are separately connected to the respective wires, while the respective welding machines are allowed to execute welding operations not only by controlling not only the energization of the wires 2 and 3 but also by controlling a feed device for feeding the wires 2 and 3.

Firstly, FIG. 1 is a view showing a stage before the welding reaches a welding termination position, that is, showing a state in which the present welding is being executed by generating the arcs 4 and 5 from the two wires 2 and 3 respectively. And, just below the arcs 4 and 5, there exists a molten pool 7 which is composed of molten metal and, as the welding proceeds in the w direction, the molten pool 7 is hardened to thereby form the weld bead 6.

Figure 2:
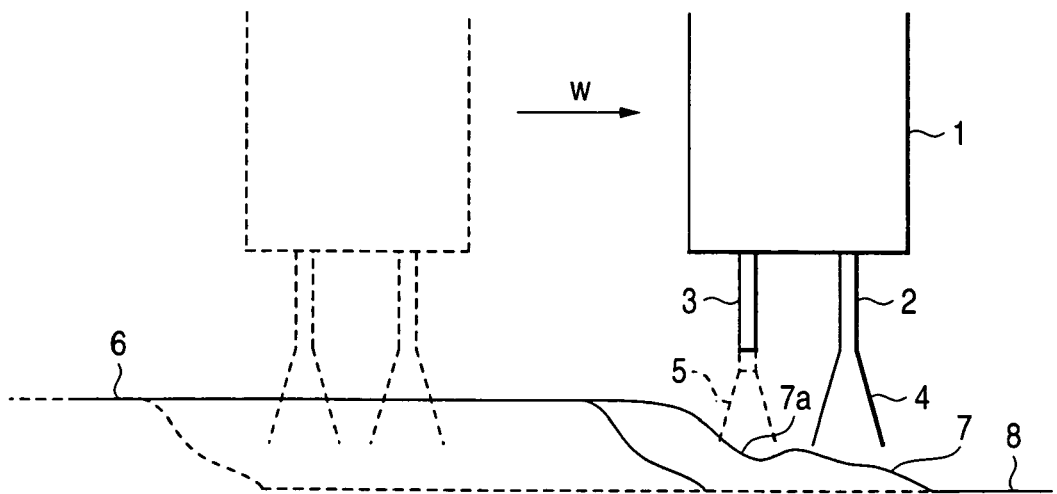
FIG. 2 is a view of the embodiment 1 of a consumable electrode arc welding method, showing a stage where its welding operation reaches a welding termination position.

Next, FIG. 2 is a view of a stage in which the present welding reaches the welding termination portion, showing a state just before execution of the welding control to be executed in the welding termination portion, which is the characteristic of the present embodiment. By the way, as will be described later, this welding control, which is to be executed starting from the welding termination portion, is the characteristic of the present embodiment. And, in this stage, the molten metal quantity of the molten pool 7 is not sufficient when compared with the weld bead 6 formed so far; and, therefore, if the welding is terminated as it is, in the end portion of the resultant weld bead, as shown in the drawings, there is produced a crater 7a. This makes it necessary to execute a welding operation for filling the crater 7a in.

For this purpose, there can be expected extra welding for filling in the crater 7a using two wires but, by so doing, there is a possibility that excessive deposition is caused. In view of this, as shown in FIG. 2, the feeding of the following wire 3 is stopped, only the preceding wire 2 is left and the generation of the arc 5 is stopped. In other words, the arc 4 of the preceding wire 2 is left, whereas the generation of the arc 5 of the following wire 3 is stopped.

Figure 3:
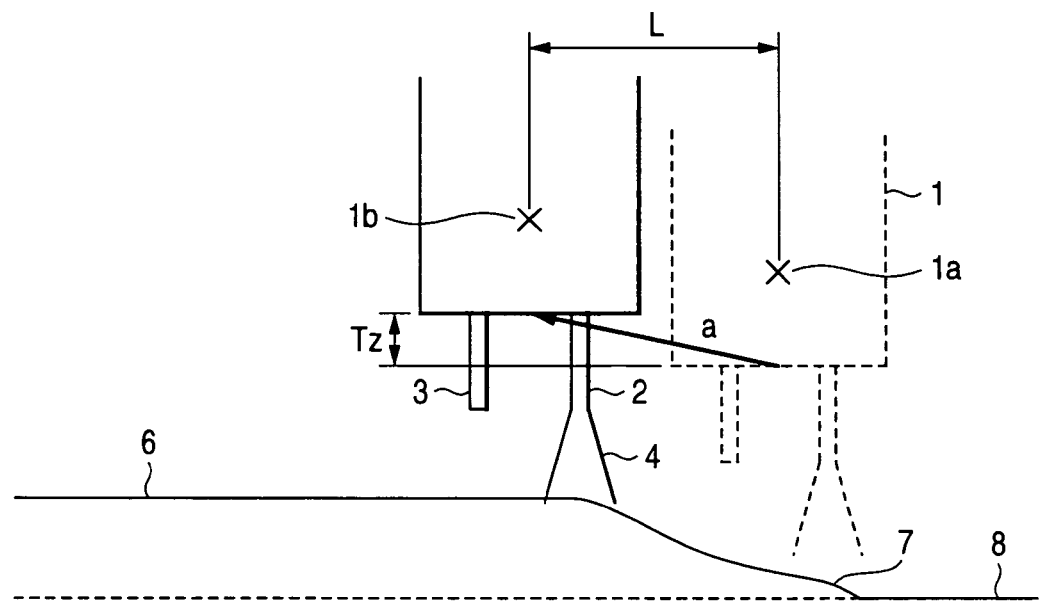
FIG. 3 is a view of the embodiment 1 of a consumable electrode arc welding method, showing a first stage of a method for controlling the welding of a welding termination portion.

Further, FIG. 3 is a view of a first stage of a welding controlling method for controlling the welding of a welding termination portion according to the present embodiment. In FIG. 3, reference character 1a designates a torch position (shown by a representative point) in the welding termination position, and 1b stands for a torch position (shown by a representative point) to which the torch 1 moved to the welding termination position is to be next moved, while the torch positions 1a, 1b are distant from each other by a distance L in the horizontal direction and by a distance Tz in the vertical direction. And, if the torch 1 advances up to the torch position 1a, the welding is executed while moving the torch 1 not only in the opposite direction to the welding proceeding direction w but also in the upward direction, that is, in an obliquely upward direction shown by an arrow mark a up to the torch position 1b which is distant by the preset distance L in the horizontal direction and by the preset distance Tz in a direction where the welding wire 2 parts vertically from the molten pool 7.

In this manner, because of the moving operation of the torch in the direction where the welding wires 2 and 3 part from the molten pool 7 and in the oblique direction to the welding proceeding direction w shown by the arrow mark a, the two wires 2 and 3 can be prevented from coming into contact with the molten pool 7. By the way, the speed of the torch moving operation in the arrow mark a and the welding condition are controlled under a previously set condition which is different from the condition that has been used so far.

Figure 4:
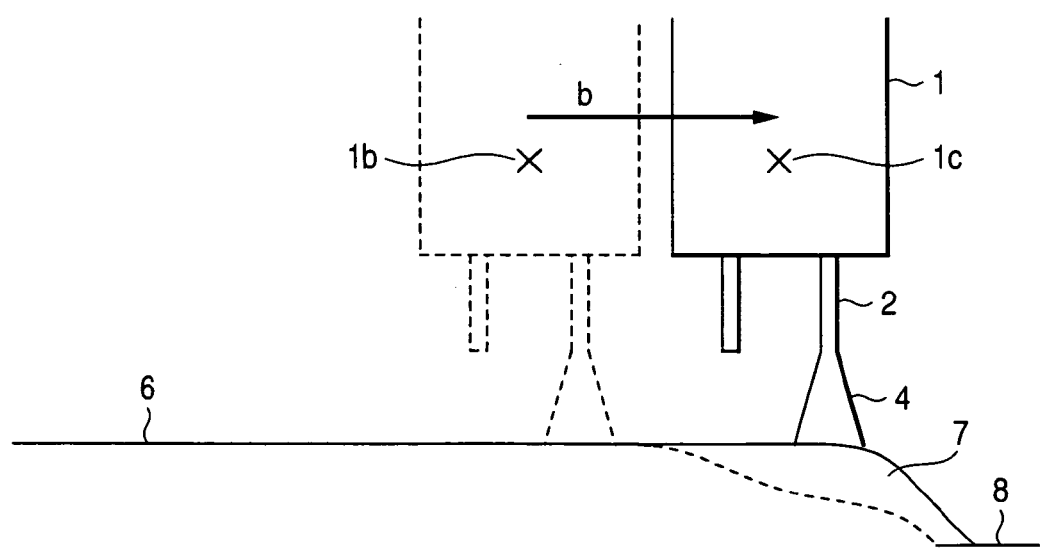
FIG. 4 is a view of the embodiment 1 of a consumable electrode arc welding method, showing a second stage of a method for controlling the welding of a welding termination portion.

Further, FIG. 4 is a view of a second stage of a welding controlling method for controlling the welding of a welding termination portion according to the present embodiment. As shown in FIG. 4, while moving the torch 1 from the torch position 1b to the torch position 1c (shown by a representative point) in the horizontal direction shown by an arrow mark b substantially parallel to the welding proceeding direction w, the welding is further carried out to fill the crater 7a in.

In this manner, in the torch moving operation in the arrow b direction as well, continuously with the torch moving operation in the arrow mark a direction in FIG. 3, the torch is moved while keeping the vertical distance Tz allowing the welding wires 2 and 3 to part from the molten pool 7, thereby being able to prevent the two welding wires 2 and 3 from coming into contact with the molten pool 7. By the way, the numerical values of these distances L and Tz are determined according to the welding conditions and, as such numerical values, there should be selected the numerical values that can provide a nice look to the shape of the welding termination position as well as can prevent the wires 2 and 3 from depositing on the molten pool 7. Also, the operation speed and welding condition at the then time are controlled under a previously set condition.

And, after the torch 1 arrives at the final welding termination position, that is, the torch position 1c, the energization of the wire 3 is ended. In this case, like the termination time in the conventional welding method using a single wire, after the torch 1 is caused to stop for a given time and the welding is carried out, the energization may be ended.

By the way, in the present embodiment, there has been shown an example in which the welding proceeding direction w of the torch 1 is moved in the horizontal direction. However, of course, this is not limitative but the welding proceeding direction w of the torch 1 may be any direction depending on the shape of the member to be welded and installation condition thereof. Also, in connection with this, the direction of the torch 1 parting from the molten pool 7 is not limited to the vertically upward direction but there can also be employed any direction, provided that such direction allows the torch 1 to part from the molten pool 7.

Figure 5:
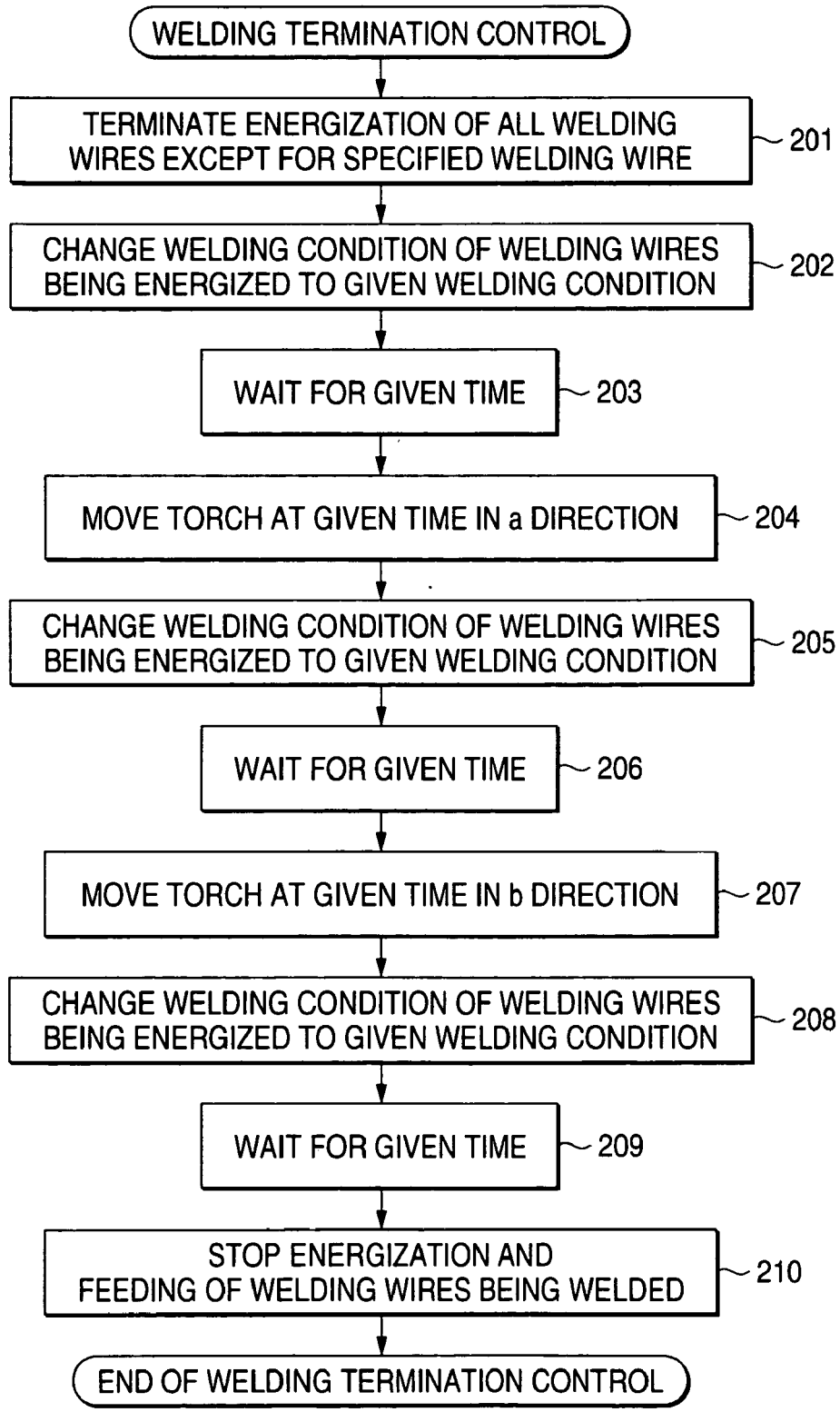
FIG. 5 is a control processing flow chart of the welding termination control of the welding termination portion used in the embodiment 1 of the invention.

Next, description will be given below of a control processing flow for welding termination control with reference to FIG. 5. FIG. 5 is a flow chart for a control processing flow for controlling welding termination control.

Firstly, in FIG. 5, in Step 201, energization of all wires except for a specified wire to be used for welding a crater is stopped. This corresponds to a portion where, while keeping generation of an arc from a preceding wire 2 shown in FIG. 2, the energization of the following wire 3 is ended to terminate the ark generation of the wire 3.

Next, in Step 202, the welding condition applied to the energizing wire (that is, the preceding wire 2) is switched over to the welding condition of the welding to be executed through the torch moving operation in the arrow mark a direction shown in FIG. 3. By the way, when it is not necessary to switch the welding condition, this step 202 may be skipped without executing any operation.

Next, in Step 203, the movement of the torch is stopped for a given time so as to wait for stabilization of the switched welding condition. By the way, in this step 203 as well, if such waiting is not necessary depending on a welding machine to be used, this step 203 may be skipped.

Next, in Step 204, the torch moving operation in the arrow mark a direction shown in FIG. 3 is executed. Further, in Step 205, the welding condition applied to the energizing wire is switched over to the welding condition of the welding to be executed by moving the torch in the arrow mark b direction shown in FIG. 4. By the way, in this case as well, if the switching of the welding condition is not necessary, this step 205 may be skipped without carrying out any operation.

Next, in Step 206, the movement of the torch is stopped for a given time so as to wait for stabilization of the switched welding condition. By the way, in this step 206 as well, if such waiting is not necessary depending on a welding machine to be used, this step 206 may be skipped.

Next, in Step 207, the torch moving operation in the arrow mark b direction shown in FIG. 4 is executed. Further, in Step 208, the welding condition applied to the energizing wire is switched over to the welding condition of the final welding to be executed by stopping the movement of the torch. By the way, in this case as well, if the switching of the welding condition is not necessary, this step 208 may be skipped without carrying out any operation.

Next, in Step 209, the movement of the torch is stopped for a given time. In this step 209 as well, if such switching of the welding condition is not necessary depending on a welding machine to be used, this step 209 may be skipped.

Finally, in Step 210, the energization of all wires and feeding of the wires are stopped to thereby stop the arc generation.

The foregoing description is the description of the example corresponding to the welding control method for controlling the welding of the consumable multiple electrode arc welding termination portion according to the present embodiment.

As has been described above, according to the present embodiment, while the crater filling-in welding is in execution, the wires 2 and 3 are moved in a direction parting away from the molten pool 7, thereby being able to prevent the wires against deposition.

By the way, in the present embodiment, description has been given of a tandem welding example of consumable multiple electrode arc welding methods in which the welding is executed by feeding two wires in a torch. However, the number of wires is not limited to two but, even when the number of wires is three or more, there can be obtained a similar effect by energizing the wires except for a wire and stopping the feeding of the wires.

EMBODIMENT 2

Next, description will be given below of a welding controlling method for controlling the welding of the consumable multiple electrode arc welding termination portion according to an embodiment 2 with reference to FIG. 6. By the way, the present embodiment, in connection with a series of operations to be executed for welding the consumable multiple electrode arc welding termination portion shown in FIGS. 1 to 4 in the embodiment 1, shows an example of a different welding control method from the welding control method which has been described previously with reference to FIG. 5

Figure 6:
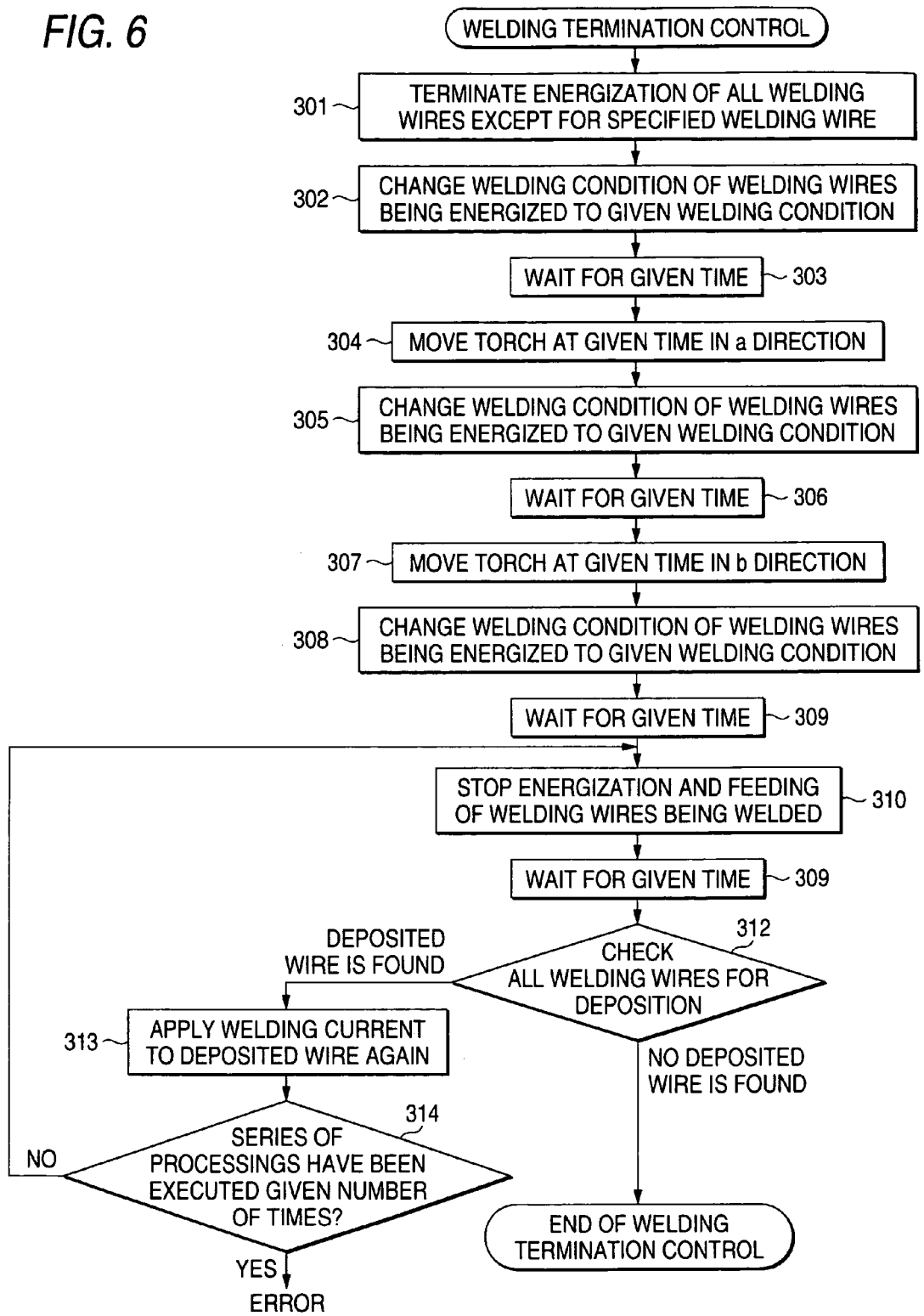
FIG. 6 is a control processing flow chart for the welding termination control of the welding termination portion used in the embodiment 1 of the invention.

FIG. 6 is a flow chart for a control processing flow for the welding termination control according to the present embodiment.

Here, in FIG. 6, Steps 301 to 309 correspond to Steps 201 to 209 in FIG. 5 respectively and the operations of the control processings are all the same. Therefore, in the present embodiment, from Step 301 to Step 309, to avoid the duplicate description, the description thereof is simplified here and description will be given below mainly of Step 310.

As a processing just before Step 310, in Step 307, the torch is moved in the arrow mark b direction shown in FIG. 4 and, further, in Step 308, after the welding condition applied to the energizing wire is switched over to a welding condition for the final welding to be executed while stopping the movement of the torch, as the need arises, in Step 309, the welding is stopped for a given time.

Next, in and after Step 310, the processing for removing the wire deposition is executed.

Firstly, in Step 310, the energization of all wires and feeding of the wires are stopped to thereby stop the arc generation.

Next, in Step 311, there is provided a stop state for a given time so as to wait not only for the complete stop of the arc generation and wire feeding but also for the stabilization of the states of the wires and weld beads. By the way, if provision of such stop state is not necessary, this step 311 may be skipped.

Next, in Step 312, all wires are checked for deposition. As a method for checking the wires for deposition, there is used a method which, using the fact that, if any wire is deposited, a current flows between the deposited wire and base metal, applies a voltage to the wire and checks whether a current flows between the wire and base metal or not. Or, if there is available a method capable of detecting the deposition of a wire, such method can also be used. For example, when a welding machine to be used has a function for detecting the wire deposition, using this function, the state signal of the welding machine is input to thereby detect the deposited state of the wire.

Here, the reason why the deposition check is executed on all wires is to check not only the preceding wire but also the following wire for deposition. In other words, in the present embodiment, as an example thereof, there is taken a consumable multiple electrode arc welding control method for controlling the welding by feeding two wires in a torch; however, even when the number of wires to be fed is three or more, all of the wires should be checked for deposition.

And, if no deposition is found in Step 312, the welding termination control is completed. If any one of the wires is found deposited, the processing advances to Step 313.

Further, in Step 313, in order to remove the deposited state of the wire, at least the welding wire, which has been found deposited, is energized again. In this case, the welding condition and energizing time are previously set by a given method. Further, after then, the processing advances to Step 314, the number of times of execution of a series of processings executed from Step 310 to Step 313 is counted and the counted number is checked whether it reaches a given number which has been set previously. And, when the deposited state of the wire cannot be removed even if the counted number reaches the given number, an error is generated to thereby stop all operations. Also, when the counted number does not reach the given number, the processing goes back to Step 310, and the wire deposition removing processings in Step 310 and in its following steps are executed again.

As has been described above, according to the present embodiment, in Step 313, by energizing again the deposited wire, the deposited state of the wire can be removed, thereby being able to prevent occurrence of a state in which the operation of the whole of the welding machine must be stopped.

Although the invention has been described heretofore in detail with reference to the specific embodiments, it is obvious to those who are skilled in the art that further changes and modifications are possible without departing from the spirit and scope of the invention.

The present application is based on the JP application (JP application 20004-123953) filed on 20th of Apr. 2004 and the contents thereof is incorporated into the present application for reference.

INDUSTRIAL PRACTICABILITY

A consumable multiple electrode arc welding method according to the invention, in a consumable multiple electrode arc welding method of a type feeding two or more wires in a torch, not only can prevent the wires from being deposited in the welding termination time but also can provide a method for removing the deposited state of the wire if the wire is found deposited. Thus, the invention is industrially useful as a control method for controlling an automatic welding machine such as a welding robot.

The invention claimed is:

1. A consumable electrode arc welding method in which two or more wires are fed and energized in a torch and the torch is moved in a first welding direction to thereby form weld beads for welding, comprising:
   a first step of stopping the feeding and energization of all wires except for a specified wire of the two or more wires at a welding termination position; and
   a second step of moving the torch a given amount from the welding termination position to a position existing not only in a second direction opposite to the first welding direction but also in a third direction away from the weld beads.

2. A consumable electrode arc welding method as set forth in claim 1, further including a third step of moving the torch substantially parallel with the weld beads in the first welding direction from the position of the torch moved in the second step.

3. A consumable electrode arc welding method as set forth in claim 2, further including: a fourth step of stopping the feeding and energization of the wires at the position of the torch moved in the third step; a fifth step of checking all wires for sticking on the weld beads; and, a sixth step of, when a stuck wire is detected in the fifth step, resuming energization on at least the detected stuck wire.

4. A consumable electrode arc welding method as set forth in claim 1, wherein a wire to be specified in a torch is a wire positioned forward of the other wire(s) when moving the torch in the first welding direction.

5. A consumable electrode arc welding method as set forth in claim 4, further including: a fourth step of stopping the feeding and energization of the wires at the position of the torch moved in the third step; a fifth step of checking all wires for sticking on the weld beads; and, a sixth step of, when a stuck wire is detected in the fifth step, resuming energization on at least the detected stuck wire.

6. A consumable electrode arc welding method as set forth in claim 1, wherein, in the second and third steps, using the wire specified in the torch, welding is executed under a welding termination time welding condition different from a welding condition used until then.

7. A consumable electrode arc welding method as set forth in claim 6, wherein, in the second and third steps, a crater processing welding for filling in a crater formed in a welding termination portion is executed under the welding termination time welding condition.

8. A consumable electrode arc welding method as set forth in claim 6, further including: a fourth step of stopping the feeding and energization of the wires at the position of the torch moved in the third step; a fifth step of checking all wires for sticking on the weld beads; and, a sixth step of, when a stuck wire is detected in the fifth step, resuming energization on at least the detected stuck wire.

* * * * *